9854X
J. G. WHITE.
No Printed Specification Available
Force Pump.
Patented July 1, 1836.
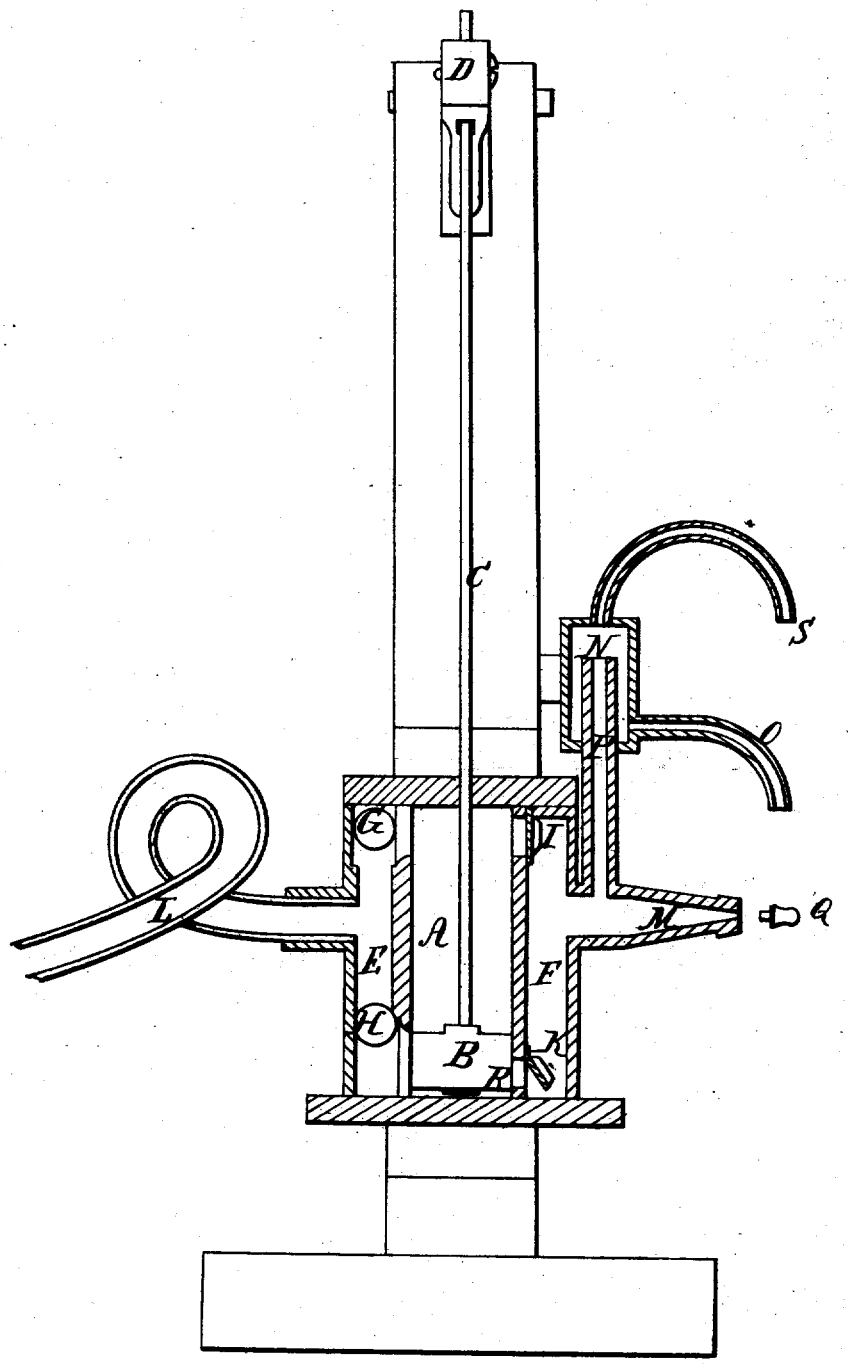
THE NORRIS PETERS CO., PHOTO-LITHO., WASHINGTON, D. C.

John G. White of Dryden State of New York.

Letters Patent.

The schedule referred to in these Letters Patent and making
part of the same containing a description in the words of the said
John G. White himself of his "Improvement in the double acting
force pump."

Be it known that I John G. White of the town of Dryden County
of Tompkins, and State of New York, have invented a new and
useful improvement in the force pump for raising water, called
"White's double acting force pump," which is described as follows
reference being had to the annexed drawings of the same making
part of this Specification ——
This pump consists of a cylinder A, closed tight at each
end in which works a solid piston B. fastened to the end
of a piston rod C, passing through one of the heads, and
worked by a lever or handle D. the piston is made of cork
on each side of the cylinder is a valve box E & F. In the
box E are two ball valves G. & H. for admitting the water
The valve box F. contains two valves I. & K. opening
from the cylinder for discharging the water, L. represents the
tube for admitting the water and M. the tube for discharging
it, N chamber in which the air is compressed, to produce
a continued uniform discharge through the tube O. by the
dilatation of the air P, tube for conducting the water to the air
chamber Q plug to stop the lower tube.
Operation, —— supposing the piston to be at [illegible]. then raised
a vacuum will be produced into which will rush the water
through the valve H, at the same time the water which was
above the piston will be forced thro' the valve I, into the air

518.

discharge pipe, the valves G and K during this operation, remaining closed. Then depress the piston and the water which filled the vacuum, will be forced through the valves K into the discharge pipe at the same time creating a vacuum, above the piston which will be instantly filled by the water rushing through the valve G; the valves H, & I, being closed as soon in the When a steady ~~stream~~ or jet d'eau is required the play must be inserted in the end of the discharge tube, the water will then be forced into the air chamber, into which extends the tube P, two thirds its depth, The water being forced into the air chamber, gets above the end of the pipe & begins to compress the air & having no way to escape except through the mouth of pipe O. which is covered with water becoming more and more compressed as the water rises, the air then begins to act on the surface of the water by its elasticity & driving the water through the tube O. in a continued stream, which is supplied by the constant action of the piston, S, second discharge pipe

What I claim as my invention & which I desire to secure by Letters Patent, consists in the before described double acting force pump

John G. White

Witnesses
Wm P. Elliot
Saml. Stettinius

Drawing

Exd
M.G.C.

1612 [illegible]